United States Patent
Cook et al.

(10) Patent No.: US 8,887,100 B1
(45) Date of Patent: Nov. 11, 2014

(54) MULTI-DIMENSIONAL HIERARCHICAL BROWSING

(75) Inventors: Scott D. Cook, Mountain View, CA (US); Michael J. Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 919 days.

(21) Appl. No.: 12/208,002

(22) Filed: Sep. 10, 2008

(51) Int. Cl.
*G06F 3/048* (2013.01)

(52) U.S. Cl.
USPC ........................................... 715/853; 715/854

(58) Field of Classification Search
USPC ................... 707/716, 722, 723, 731; 715/854
See application file for complete search history.

(56) References Cited

U.S. PATENT DOCUMENTS

| | | | |
|---|---|---|---|
| 6,418,429 B1 * | 7/2002 | Borovoy et al. ....................... 1/1 |
| 6,584,471 B1 * | 6/2003 | Maclin et al. ................. 707/752 |
| 7,058,624 B2 * | 6/2006 | Masters ......................... 707/723 |
| 7,769,752 B1 * | 8/2010 | Turner et al. .................. 707/731 |
| 2004/0169688 A1 * | 9/2004 | Burdick et al. ............... 345/854 |
| 2007/0060114 A1 * | 3/2007 | Ramer et al. .................. 455/418 |
| 2007/0088690 A1 * | 4/2007 | Wiggen et al. .................... 707/5 |
| 2008/0010250 A1 * | 1/2008 | Fontoura et al. .................. 707/3 |
| 2008/0028067 A1 * | 1/2008 | Berkhin et al. ............... 709/224 |
| 2009/0193007 A1 * | 7/2009 | Mastalli et al. .................... 707/5 |

OTHER PUBLICATIONS

Yahoo! TV, The $10,000 Pyramid, Jan. 8, 2007, http://web.archive.org/web/20070108055549/http://tv.yahoo.com/the-10-000-pyramid/show/28443/castcrew.*

* cited by examiner

*Primary Examiner* — Matt Kim
*Assistant Examiner* — William Trapanese
(74) *Attorney, Agent, or Firm* — Park, Vaughan, Fleming & Dowler LLP

(57) ABSTRACT

Some embodiments of the present invention provide a system that accesses information using multiple hierarchies. During operation, the system receives a specifier for a first location in a first hierarchy and a specifier for a second location in a second hierarchy. Next, the system retrieves information, if such information exists, from an intersection between the first location in the first hierarchy and the second location in the second hierarchy. Finally, the system presents the retrieved information to a user.

20 Claims, 7 Drawing Sheets

MULTI-DIMENSIONAL HIERARCHICAL BROWSING

BACKGROUND

1. Field

The present invention generally relates to mechanisms for accessing data on computer systems. More specifically, the present invention relates to a method and an apparatus that facilitates using more than one hierarchical axis to access relevant pieces of information.

2. Related Art

Recent advances in information technology presently make it possible for users to access large volumes of information relating to just about any topic. However, it is often a challenging task to locate a specific piece of information that is helpful to a user on a fine-grained scale. For example, business owners who are seeking information about dealing with suppliers do not merely need information about suppliers in general—they need information about suppliers for their specific industry and for businesses which are the same size as their business. The same problem occurs more generally where a large amount of highly specific information exists (e.g., about products, such as cameras), and information about specific uses of those products is required (e.g., sports photography at night).

The problem, in abstract, is to provide a mechanism that enables users with highly granular needs to navigate through a large (and ever-growing) database of information. In particular, a user needs to find information that: is relevant to the user; has the right level of specificity for the user's needs; assumes the right level of expertise for the user; is genuinely useful; and is accurate.

Common solutions to this problem include indexed search systems, hierarchical browsing systems and tagging systems. Indexed search systems require that the user know enough about the information they are looking for (and the database over which they are searching) to formulate an effective query. Hierarchical browsing systems are typically single-dimensional, either requiring the user to traverse innumerable fine branches within the browsing hierarchy, or simply not presenting sufficiently fine-grained distinctions within the hierarchy to enable the user to quickly locate the needed information. Tagging systems are flat rather than hierarchical. This makes them relatively easy to maintain, but makes navigation to relevant content harder because everything falling into a particular tag (or combination of tags) is presented to the user at once.

SUMMARY

Some embodiments of the present invention provide a system that accesses information using multiple hierarchies. During operation, the system receives a specifier for a first location in a first hierarchy and a specifier for a second location in a second hierarchy. Next, the system retrieves information, if such information exists, from an intersection between the first location in the first hierarchy and the second location in the second hierarchy. Finally, the system presents the retrieved information to a user.

In some embodiments, the first hierarchy and the second hierarchy each comprise a branching structure, wherein a given location in the branching structure can branch to multiple lower-level locations in the branching structure.

In some embodiments, the system allows a user to add a branch to the branching structure of the first hierarchy and/or the second hierarchy.

In some embodiments, a given location in first or second hierarchy contains a superset of associated lower-level locations which branch from the given location.

In some embodiments, the system additionally presents a user interface to the user. This user interface includes a first bread crumb trail which represents a path to the first location through higher-level locations in the first hierarchy. The user interface also includes a second bread crumb trail which represents a path to the second location through higher-level locations in the second hierarchy.

In some embodiments, the first bread crumb trail is a two-way bread crumb trail. Like a conventional bread crumb trail, this two-way bread crumb trail presents a path through higher-level locations in the first hierarchy to the first location, wherein the user can select a higher-level location on the path to navigate to the higher-level location. However, unlike a conventional bread crumb trail, the two-way bread crumb trail additionally presents zero, one or more lower-level locations, which branch from the first location in the first hierarchy, wherein the user can select a lower-level location to navigate to the lower-level location.

In some embodiments, if the intersection between the first location and the second location is empty, the system generalizes the search by updating the first location to a higher-level location in the first hierarchy and/or updating the second location to a higher-level location in the second hierarchy, so that information hopefully exists in the intersection between the generalized first location and/or the generalized second location.

In some embodiments, the system is: a help system; a consumer product application or website; a medical condition advice system; or a decision-making system.

Some embodiments of the present invention provide a system that obtains location-specific ranking information for a piece of information. During operation, the system receives a request from a user for ranking information related to the piece of information. In response to the request, the system: obtains location information which specifies a location of the piece of information in a hierarchy; looks up location-specific ranking information for the piece of information based on the location of the piece of information in the hierarchy; and returns the location-specific ranking information to the user.

In some embodiments, prior to receiving the request, the system obtains ranking information for the piece of information. During this process, the system receives location-specific ranking information for the piece of information from a user while the user is accessing an instance of the piece of information at a specific location in the hierarchy. Next, the system uses the location-specific ranking information to update stored location-specific ranking information for the piece of information.

DETAILED DESCRIPTION

Figure 1:
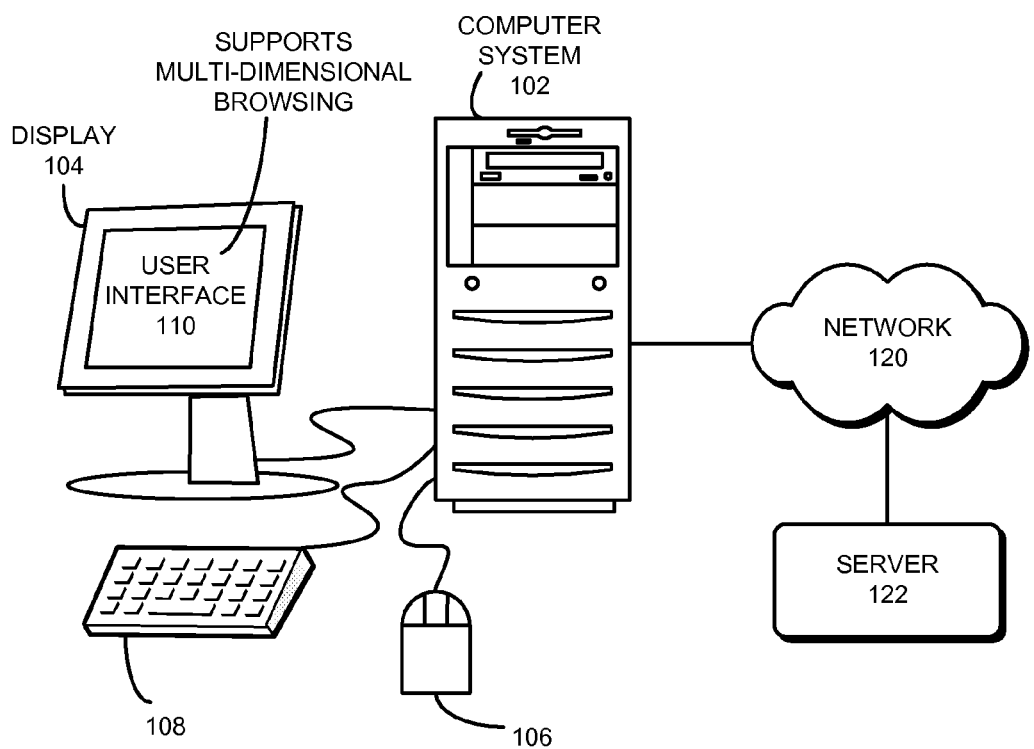
FIG. 1 illustrates a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system.

The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention provide a multi-dimensional browsing interface that facilitates navigating through information and obtaining user-contributed rankings for the information. A major insight underlying the present invention is that more than one dimension of categorization is often needed to specify the relevant attributes of a piece of information. Hence, the system provides an easy way for users to browse through information using multiple dimensions, which provides an improvement over existing directories and search systems.

In some embodiments of the present invention, the location of each piece of information (which is also referred to as an "item of content") is determined by more than one hierarchical axis. For example, a system may include two hierarchies, one relating to the type of issue the user is looking to resolve (e.g., an employment law issue), and the other specifying the industry for which the user is looking for a solution (e.g., the garment industry).

In one embodiment, a user can navigate to obtain relevant information by stepping down each hierarchy presented to the user to obtain the specificity the user requires. Moreover, as a user navigates, the path the user has traversed can be presented to the user as retraceable bread crumbs.

In some embodiments, a user has the option of contributing a new branch to the hierarchy wherever the user sees a need for one, to extend the hierarchy. New information can then be added to the new branch, or existing information can be assigned to it. This enables the hierarchy to expand fractally over time through user contributions.

Note that the location of a piece of information is specified by its combined location in multiple hierarchies (e.g., issue hierarchy=advertising and industry hierarchy=criminal law). Moreover, a piece of information can be located in more than one position (e.g., in two industries) rather than sticking to a physical location model where a piece of information can only be located at a single position.

In some embodiments, a higher level location in a hierarchy contains a superset of the information in locations below it in the hierarchy, or alternatively, information could be separately assigned to each level. Note that the former could lead to too much information, requiring the user to navigate deeper into the hierarchy. However, the latter could just be confusing to the user, making the user think that the information the user is looking for does not exist, when actually the user merely has not navigated to the right point in the hierarchy to find it.

Some embodiments of the present invention additionally support ranking information based on the position of the information in the hierarchy. Note that this ranking can be based on "explicit ranking information" which is explicitly provided by users, or alternatively can be based on "implicit ranking information" which is determined from users' behaviors. Hence, within any location in a hierarchy, pieces of information can be presented in rank order, where the rank is derived from the stated preferences or behaviors of users.

We now describe an exemplary system which facilitates multi-dimensional retrieval and ranking.

System

FIG. 1 illustrates a computer system 102 in accordance with an embodiment of the present invention. Computer system 102 can generally include any type of computer system based on a microprocessor, a mainframe computer, a digital signal processor, a portable computing device, a personal organizer, a device controller, or a computational engine within an appliance.

Computer system 102 includes a display 104, which displays images and/or text to one or more users of computing device 102. Those skilled in the art will appreciate that display 104 may incorporate various types of display technology to render and display images.

Computer system 102 can also include various input devices, such as pointing device 106 and keyboard 108. Pointing device can generally include any type of device which allows a user to move a cursor within display 104. For example, pointing device 106 may include a mouse, a touch pad, a finger or a stylus on a touch-sensitive display, a trackball, a pointing stick, a joystick, a game controller, and/or a remote control. Keyboard 108 can generally include any type of device that allows a user to manually enter textual or numerical data into computer system 102. Those skilled in the art will appreciate that other input devices (not shown) may exist on computing device 102. For example, computing device 102 may also include a microphone, a webcam, a remote control, and/or one or more sets of device-specific buttons.

Computer system 102 communicates with a server 122 through a network 120. Server 122 can generally include any computational node including a mechanism for servicing requests from a client for computational and/or data storage resources. Network 120 can include any type of wired or wireless communication channel capable of coupling together computing nodes. This includes, but is not limited to, a local area network, a wide area network, or a combination of networks. In one embodiment of the present invention, network 120 includes the Internet. In some embodiments of the present invention, network 120 includes phone and cellular phone networks.

Computer system 102 also supports a user interface 110 which allows a user to view and manipulate menus, icons, windows, emails, websites, videos, pictures, maps, documents, and/or other system components. In some embodiments, user interface 110 supports multi-dimensional browsing which enables a user to access information using multiple hierarchies (as is described in more detail below). Note that this information can either be stored locally on computer system 102, or remotely on server 122.

Multi-Dimensional Retrieval

Figure 2:
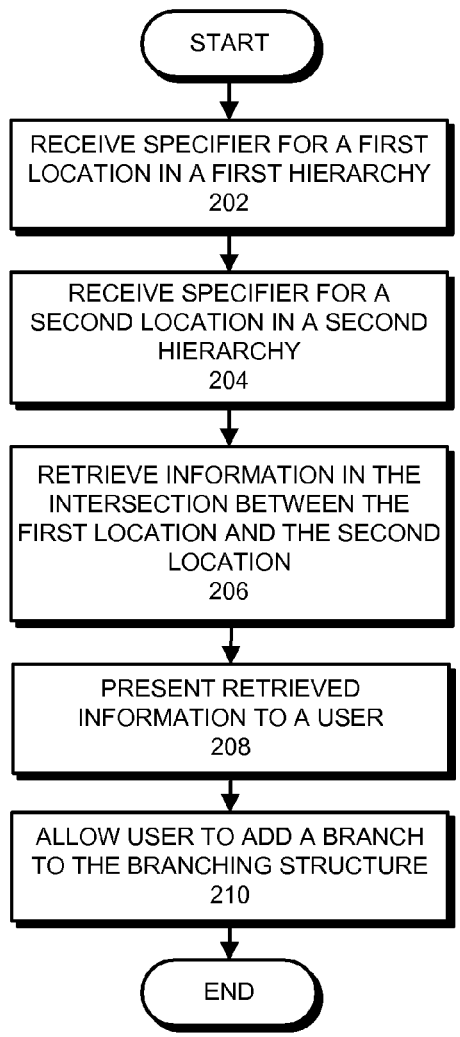
FIG. 2 presents a flow chart illustrating the process of retrieving information using multiple hierarchies in accordance with an embodiment of the present invention.

FIG. 2 presents a flow chart illustrating the process of retrieving information using multiple hierarchies in accordance with an embodiment of the present invention. Although the retrieval process is described for a system that supports two hierarchies, the process can be easily generalized to support three or more hierarchies.

During operation, the system receives a specifier for a first location in a first hierarchy (step 202) and a specifier for a second location in a second hierarchy (step 204). In some embodiments, the first hierarchy and the second hierarchy each comprise a branching structure, wherein a given location in the branching structure can branch to multiple lower-level locations in the branching structure. Also, in some embodiments, a given location in the first or second hierarchy contains a superset of associated lower-level locations which branch from the given location.

Next, the system retrieves information, if such information exists, from an intersection between the first location in the first hierarchy and the second location in the second hierarchy (step 206). The system then presents the retrieved information to a user (step 208).

Finally, the system allows a user to add a branch to the branching structure of the first hierarchy and/or the second hierarchy (step 210). Hence, the system allows a user to contribute to the branching structure of each hierarchy.

Figure 3:
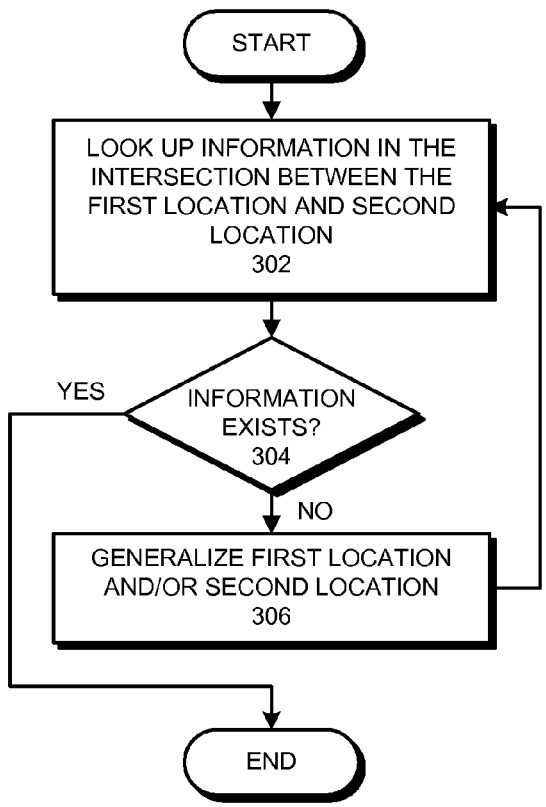
FIG. 3 presents a flow chart illustrating the process of generalizing a location when the intersection between multiple locations is empty in accordance with an embodiment of the present invention.

FIG. 3 presents a flow chart illustrating the process of retrieving information from the intersection of two hierarchies in accordance with an embodiment of the present invention. (This flow chart describes in more detail the process which takes place during step 206 in the flow chart illustrated in FIG. 2.) First, the system performs a search to look up information from the intersection between the first location in the first hierarchy and the second location in the second hierarchy (step 302). Next, the system determines from the search whether such information exists (step 304). If so, the process is complete.

On the other hand, if such information does not exist, the system generalizes the search by updating the first location to a higher-level location in the first hierarchy (referred to as "up-leveling") and/or up-leveling the second location to a higher-level location in the second hierarchy, so that information hopefully exists in the intersection between the first location and second location (step 306).

This generalization can happen in a number of ways. For example, the system can compare the content obtained by up-leveling the first location with the content obtained by up-leveling the second location and can automatically choose to up-level the location which yields the smallest amount of content. The system can also provide a manual override option which enables the user to up-level the non-selected location to see more content. The system can alternatively inform the user that no content exists and can ask the user to manually up-level one or more of the selected locations.

Location-Specific Ranking

Figure 4:
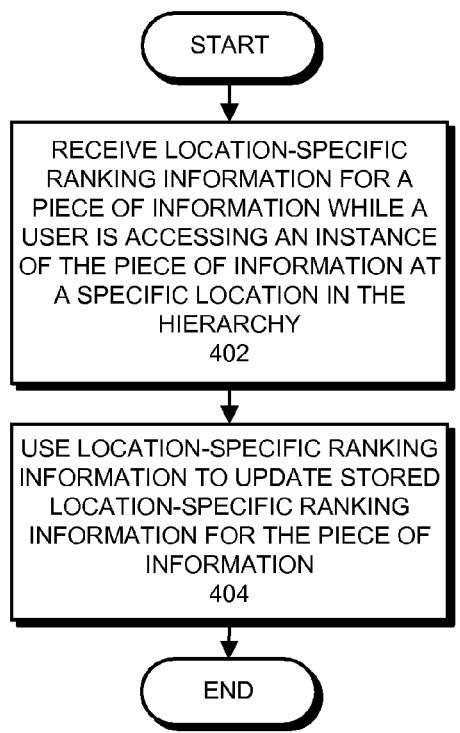
FIG. 4 presents a flow chart illustrating the process of updating location-specific ranking information in accordance with an embodiment of the present invention.

FIG. 4 presents a flow chart illustrating the process of updating location-specific ranking information in accordance with an embodiment of the present invention. During this process, the system receives location-specific ranking information for a piece of information from a user while the user is accessing an instance of the piece of information at a specific location in the hierarchy (step 402). Next, the system uses the location-specific ranking information to update stored location-specific ranking information for the piece of information (step 404).

Figure 5:
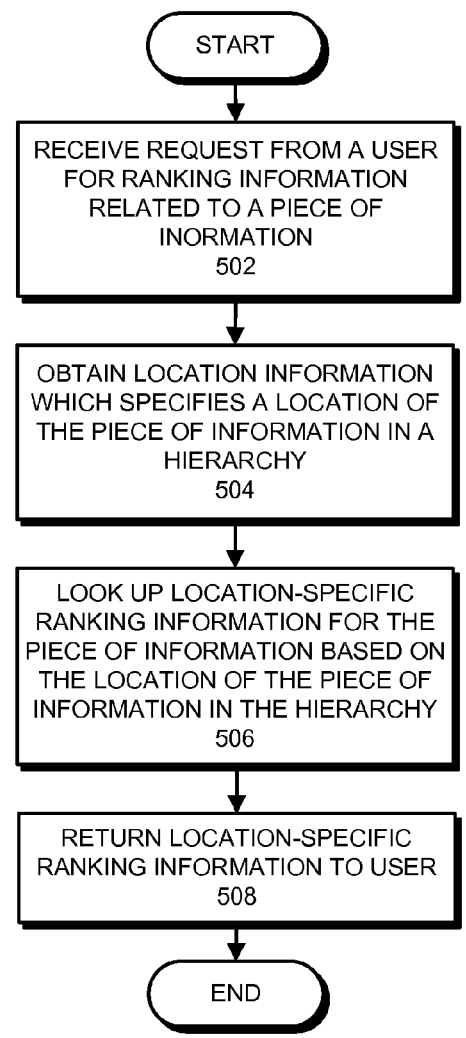
FIG. 5 presents a flow chart illustrating the process of looking up location-specific ranking information in accordance with an embodiment of the present invention.

FIG. 5 presents a flow chart illustrating the process of looking up location-specific ranking information in accordance with an embodiment of the present invention. During operation, the system receives a request from a user to look up ranking information related to the piece of information (step 502). In response to the request, the system: obtains location information which specifies a location of the piece of information in a hierarchy (step 504), and then looks up the location-specific ranking information for the piece of information based on the location of the piece of information in the hierarchy (step 506). Finally, the system returns the location-specific ranking information to the user (step 508).

The system can obtain ranking information that measures a number of different attributes for a piece of information. For example, the ranking information can measure usefulness, freshness and relevance of a piece of information. (1) Usefulness can be measured implicitly based on: average length of time viewing a piece of information (capped to account for idle time), whether the piece of information was saved and/or printed, and whether or not the piece of information was the endpoint of the user's browsing session. (2) Freshness can be measured based upon the creation date of the piece of information or when the piece of information was last modified. (3) Finally, relevance can be determined by deducing the industry of users who view the information, based on analysis of the users' browsing histories (in what industries do they spend their time browsing?). Note these different types of ranking information can be presented separately, or can be combined via a weighting algorithm.

Moreover, the relevance and usefulness measures can be made relative to a user's position in a hierarchy to enable those measures to reflect the consumption behavior of users who are similar to the current user. The idea is to match the rankings to the level of specificity that the current user is seeking, so that the relevance and usefulness of the information (at the level the user has reached in the hierarchy) is what is reflected to the user in the rankings. Hence, pieces of information that other users (who have browsed to where the user has browsed) found useful will receive a higher ranking. This also attacks the problem of the glut of information at higher levels of "superset" hierarchies.

Ranking can also be based on other factors. For example, rankings can be based on volume of readership. However, this tends to favor older pieces of information and makes it hard for newer and potentially more valuable pieces of information to be found. Ranking can also be based on average length of time per viewing because readers generally do not dwell on irrelevant content. However, this rewards longer pieces of information because longer pieces will take more time to view even if they are no more relevant. This problem can be somewhat remedied by capping the average length of time per viewing so as not to reward longer pieces of information.

The system can also consider other factors, such as repeat views and whether the user saved or printed the information.

Bread Crumb Trails

In some embodiments, the system additionally presents the multiple hierarchies to the user through a user interface 110 which supports bread crumb trails. For example, user interface 110 can include a first bread crumb trail, which represents a path to the first location through higher-level locations in the first hierarchy, and a second bread crumb trail, which represents a path to the second location through higher-level locations in the second hierarchy.

Figure 6:
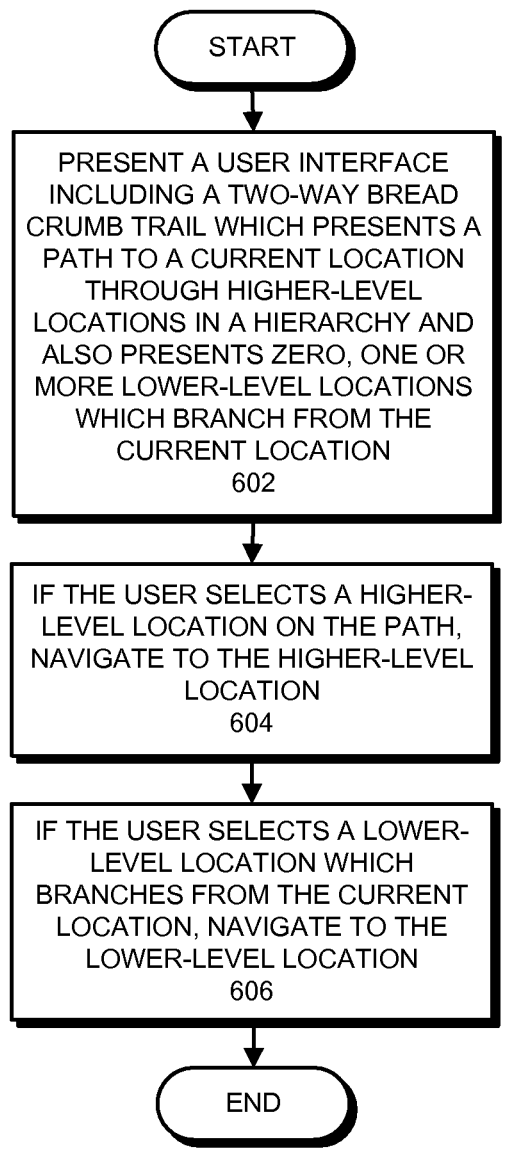
FIG. 6 presents a flow chart illustrating the process of operating a two-way bread crumb trail in accordance with an embodiment of the present invention.

In some embodiments, the first bread crumb trail and/or the second bread crumb trail can be a two-way bread crumb trail. Referring to FIG. 6, this two-way bread crumb trail operates generally as follows. First, the system presents a user interface, which includes the two-way bread crumb trail, to a user. This two-way bread crumb trail presents a path through higher-level locations in the hierarchy to a current location (step 602). If the user selects a higher-level location on the path, the system navigates to the selected higher-level location (step 604). The two-way bread crumb trail also presents zero, one or more lower-level locations to the user, which branch from the current location. If the user selects a lower-level location on the path, the system navigates to the selected lower-level location (step 606).

Example

Figure 7A:
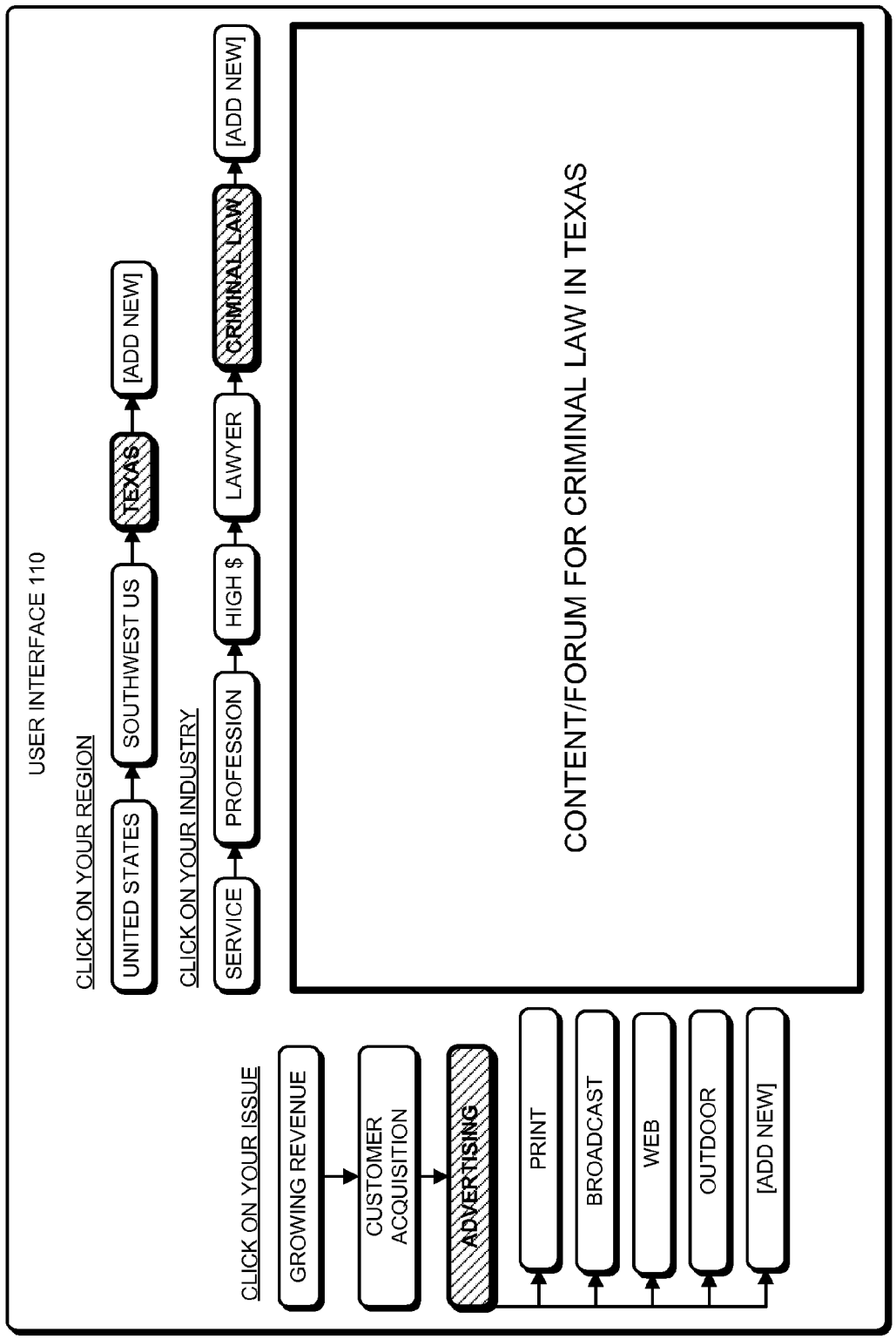
FIG. 7A presents an exemplary screenshot of a user interface in accordance with an embodiment of the present invention.
Figure 7B:
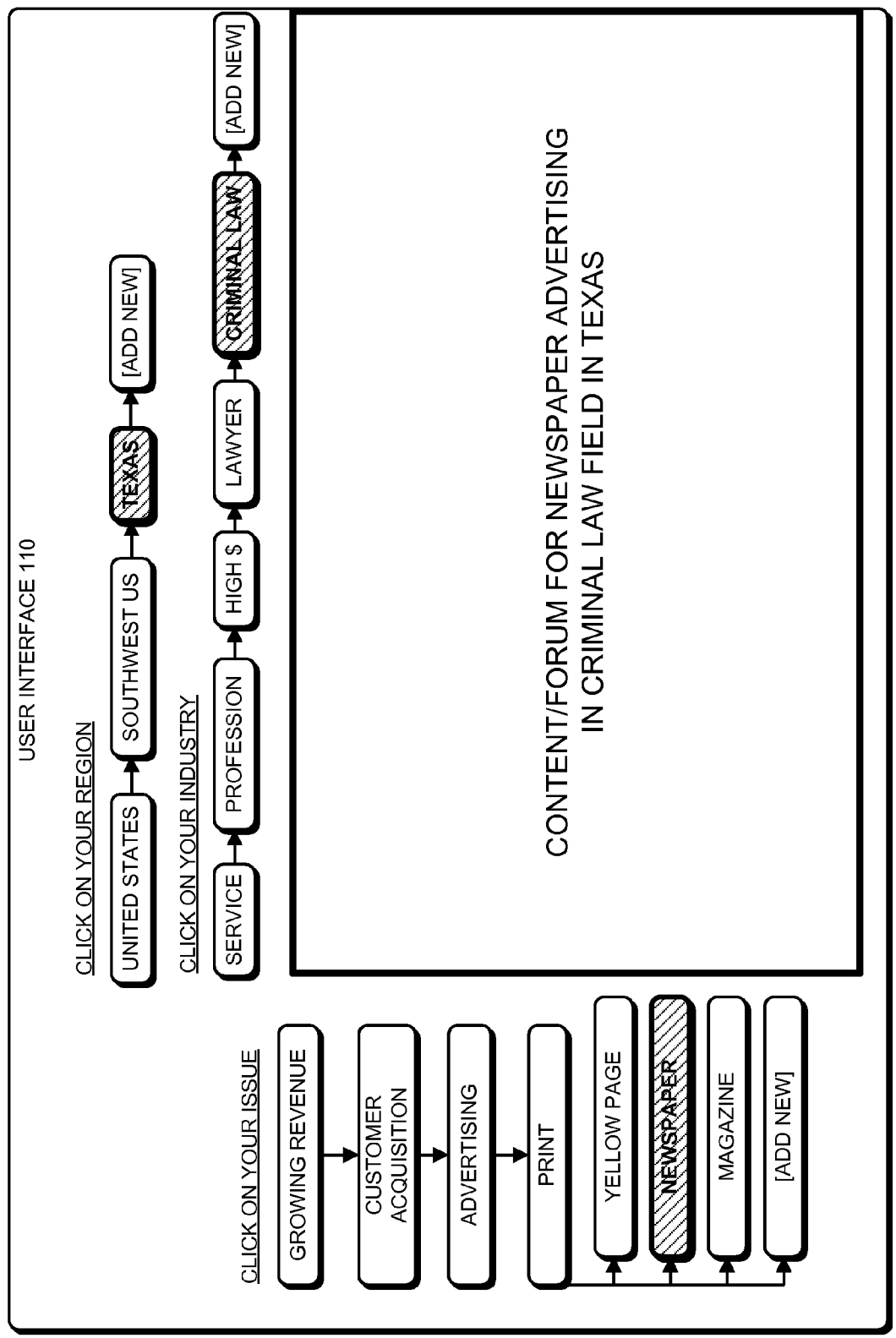
FIG. 7B presents an exemplary screenshot of a user interface in accordance with an embodiment of the present invention.
Figure 7C:
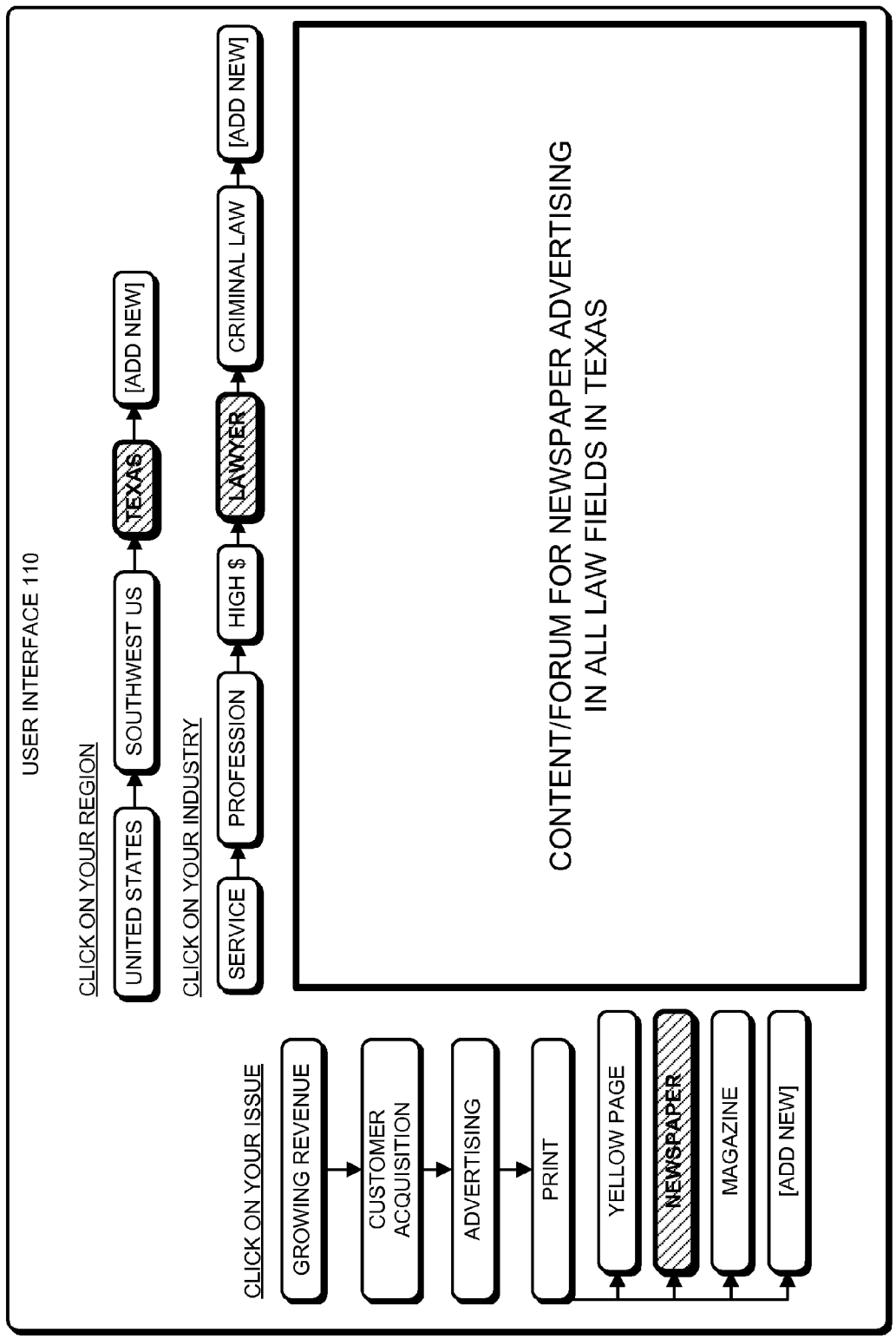
FIG. 7C presents an exemplary screenshot of a user interface in accordance with an embodiment of the present invention.

For example, FIGS. 7A-7C present exemplary screenshots of a user interface that supports accessing information through multiple hierarchies in accordance with an embodiment of the present invention. Note that this user interface supports two-way bread crumbs that effectively act as tabs in two dimensions. Like a conventional bread crumb trail, this two-way bread crumb trail shows a path through higher-level locations in the hierarchy to a current location in the hierarchy. However, unlike a conventional bread crumb trail, the two-way bread crumb trail additionally displays choices in the forward direction from the current location to lower-level locations in the hierarchy. This two-way bread crumb trail also facilitates user contribution by allowing users to add branches in any forward direction.

Suppose a user wants to find content related to a customer acquisition for her service business but wants content which is right for her situation as she ponders newspaper advertising for her criminal law firm in Texas. Referring to FIG. 7A, she clicks forward on the first horizontal bread crumb trail to select region of "Texas" and then clicks forward on the second horizontal bread crumb trail to select the micro-vertical industry of "Criminal Law." She then clicks forward to select her issue. Note that this process is intuitive because when she clicks a choice, such as "Advertising", the two-way bread crumb trail displays the choices at the next level forward (e.g., Print, Broadcast, etc.). Note that the bread crumbs also act as tabs which enable the user to determine where she is in the hierarchy.

Next, referring to FIG. 7B, the user can zoom down to see just the content on "Newspaper Advertising" for Criminal Law firms in Texas.

Finally, referring to FIG. 7C, the user can zoom out to see "Newspaper Advertising" for all Law firms in Texas, perhaps because there exists no content for just Criminal Law firms, or because she thinks that content which applies to other kinds of law firms might be useful to her. Moreover, note that the user can add a choice via the "Add New" link option.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for accessing information using multiple hierarchies, comprising:
    displaying a branching structure for a first hierarchy and a second hierarchy in a user interface by expanding the branching structure for the first hierarchy and the branching structure for the second hierarchy, wherein the branching structures for the first hierarchy and the second hierarchy comprise separate bread crumb trails that each represent a path to a given location through other locations in the corresponding hierarchy;
    receiving, from a user, a specifier for a first location in the first hierarchy and a specifier for a second location in the second hierarchy;
    retrieving information, if such information exists, from an intersection between the first location in the first hierarchy and the second location in the second hierarchy;
    using browsing histories for users that have browsed the hierarchy to determine a set of the users that have each browsed to at least one of the first location and the second location, wherein the set of the users comprises at least one of the users that is different from the user;
    determining a ranking for the information by using rankings from the set of the users, wherein determining the ranking comprises using a given ranking in the rankings, wherein the given ranking corresponds to a given user in the set of the users that has browsed to a browsed location, and wherein the given ranking is determined based on at least one of an indication whether or not the given user saved the browsed location and an indication whether or not the browsed location was an endpoint of a browsing session for the given user; and
    presenting the retrieved information to the user in a rank order based on the ranking.

2. The method of claim 1, wherein a given location in the first or second hierarchy contains a superset of associated lower-level locations which branch from the given location.

3. The method of claim 1, wherein the method is performed by:
    a help system;
    a consumer product application or website;
    a medical condition advice system; and
    a decision-making system.

4. The method of claim 1, further comprising:
    allowing a user to add a branch to the branching structure of the first hierarchy and/or the second hierarchy.

5. The method of claim 4, wherein allowing the user to add the branch to the branching structure of at least one of the first hierarchy or the second hierarchy additionally involves allowing the user to add information to the branch.

6. The method of claim 1, further comprising, in response to determining that the intersection between the first location and the second location is empty, generalizing the search without user intervention by updating the first location to a higher-level location in the first hierarchy and/or updating the second location to a higher-level location in the second hierarchy until information exists in the intersection between the first location and second location.

7. The method of claim 6, further comprising:
comparing a content obtained by updating the first location to a content obtained by updating the second location; and,
presenting to the user only the smallest of the content obtained by updating the first location and the content obtained by updating the second location.

8. The method of claim 1, wherein the browsing session corresponds to a browsing history in the browsing histories.

9. The method of claim 1, wherein the given ranking is determined based on the indication whether or not the given user saved the browsed location, and wherein the browsed location comprises at least one of the first location and the second location.

10. The method of claim 1, wherein the given ranking is determined based on the indication whether or not the browsed location was the endpoint of the browsing session, and wherein the browsed location comprises at least one of the first location and the second location.

11. A method for accessing information, comprising:
presenting a user interface to a user, wherein presenting the user interface comprises displaying a branching structure for a first hierarchy and a second hierarchy in a user interface by expanding the branching structure for the first hierarchy and the branching structure for the second hierarchy, and wherein the user interface includes a two-way bread crumb trail which presents a path to a location through higher-level locations in a hierarchy, and also presents one or more lower-level locations, which branch from the location;
navigating to the higher-level location when the user selects the higher-level location on the path;
navigating to a lower-level location when the user selects the lower-level location which branches from the location;
receiving, from a user, a specifier for a first location in the first hierarchy and a specifier for a second location in the second hierarchy;
retrieving information, if such information exists, from an intersection between the first location in the first hierarchy and the second location in the second hierarchy;
using browsing histories for users that have browsed the hierarchy to determine a set of the users that have each browsed to at least one of the first location and the second location, wherein the set of the users comprises at least one of the users that is different from the user;
determining a ranking for the information by using rankings from the set of the users, wherein determining the ranking comprises using a given ranking in the rankings, wherein the given ranking corresponds to a given user in the set of the users that has browsed to a browsed location, and wherein the given ranking is determined based on at least one of an indication whether or not the given user saved the browsed location and an indication whether or not the browsed location was an endpoint of a browsing session for the given user; and,
presenting the retrieved information to the user in a rank order based on the ranking.

12. A non-transitory computer-readable storage medium storing instructions that when executed by a computer cause the computer to perform a method for accessing information using multiple hierarchies, the method comprising:
displaying a branching structure for a first hierarchy and a second hierarchy in a user interface by expanding the branching structure for the first hierarchy and the branching structure for the second hierarchy, wherein the branching structures for the first hierarchy and the second hierarchy comprise separate bread crumb trails that each represent a path to a given location through other locations in the corresponding hierarchy;
receiving, from a user, a specifier for a first location in the first hierarchy and a specifier for a second location in the second hierarchy;
retrieving information, if such information exists, from an intersection between the first location in the first hierarchy and the second location in the second hierarchy;
using browsing histories for users that have browsed the hierarchy to determine a set of the users that have each browsed to at least one of the first location and the second location, wherein the set of the users comprises at least one of the users that is different from the user;
determining a ranking for the information by using rankings from the set of the users, wherein determining the ranking comprises using a given ranking in the rankings, wherein the given ranking corresponds to a given user in the set of the users that has browsed to a browsed location, and wherein the given ranking is determined based on at least one of an indication whether or not the given user saved the browsed location and an indication whether or not the browsed location was an endpoint of a browsing session for the given user; and,
presenting the retrieved information to the user in a rank order based on the ranking.

13. The computer-readable storage medium of claim 12, further comprising allowing the user to add a branch to the branching structure of at least one of the first hierarchy or the second hierarchy, wherein allowing the user to add the branch involves allowing the user to add information to the branch.

14. The computer-readable storage medium of claim 12, wherein a given location in first or second hierarchy contains a superset of associated lower-level locations which branch from the given location.

15. The computer-readable storage medium of claim 12, wherein if the intersection between the first location and the second location is empty, the method further comprises generalizing the search by updating the first location to a higher-level location in the first hierarchy and/or updating the second location to a higher-level location in the second hierarchy, so that information exists in the intersection between the first location and second location.

16. A non-transitory computer-readable storage medium storing instructions that when executed by a computer cause the computer to perform a method for accessing information, the method comprising:
presenting a user interface to a user, wherein presenting the user interface comprises displaying a branching structure for a first hierarchy and a second hierarchy in a user interface by expanding the branching structure for the first hierarchy and the branching structure for the second hierarchy, and wherein the user interface includes a two-way bread crumb trail which presents a path to a location through higher-level locations in a hierarchy, and also presents one or more lower-level locations, which branch from the location;

navigating to the higher-level location when the user selects the higher-level location on the path;

navigating to a lower-level location when the user selects the lower-level location which branches from the location;

receiving, from a user, a specifier for a first location in the first hierarchy and a specifier for a second location in the second hierarchy;

retrieving information, if such information exists, from an intersection between the first location in the first hierarchy and the second location in the second hierarchy;

using browsing histories for users that have browsed the hierarchy to determine a set of the users that have each browsed to at least one of the first location and the second location, wherein the set of the users comprises at least one of the users that is different from the user;

determining a ranking for the information by using rankings from the set of the users, wherein determining the ranking comprises using a given ranking in the rankings, wherein the given ranking corresponds to a given user in the set of the users that has browsed to a browsed location, and wherein the given ranking is determined based on at least one of an indication whether or not the given user saved the browsed location and an indication whether or not the browsed location was an endpoint of a browsing session for the given user; and, presenting the retrieved information to the user in a rank order based on the ranking.

17. An apparatus that facilitates accessing information using multiple hierarchies, comprising:

a processor;

a user interface configured to,
  display a branching structure for a first hierarchy and a second hierarchy by expanding the branching structure for the first hierarchy and the branching structure for the second hierarchy in different dimensions, wherein the branching structures for the first hierarchy and the second hierarchy comprise separate bread crumb trails that each represent a path to a given location through other locations in the corresponding hierarchy;
  receive, from a user, a specifier for a first location in the first and a specifier for a second location in the second hierarchy; and a retrieval mechanism configured to:
  retrieve information, if such information exists, from an intersection between the first location in the first hierarchy and the second location in the second hierarchy;
  use browsing histories for users that have browsed the hierarchy to determine a set of the users that have each browsed to at least one of the first location and the second location, wherein the set of the users comprises at least one of the users that is different from the user; and
  determine a ranking for the information by using rankings from the set of the users, wherein determining the ranking comprises using a given ranking in the rankings, wherein the given ranking corresponds to a given user in the set of the users that has browsed to a browsed location, and wherein the given ranking is determined based on at least one of an indication whether or not the given user saved the browsed location and an indication whether or not the browsed location was an endpoint of a browsing session for the given user;

wherein the user interface is configured to present the retrieved information to the user in a rank order based on the ranking.

18. The apparatus of claim 17, wherein the user interface is configured to allow a user to add a branch to the branching structure of at least one of the first hierarchy and the second hierarchy, wherein, while allowing the user to add the branch, the user interface is additionally configured to allow the user to add information to the branch.

19. The apparatus of claim 17, wherein if the intersection between the first location and the second location is empty, the retrieval mechanism is additionally configured to generalize the search by updating the first location to a higher-level location in the first hierarchy and/or updating the second location to a higher-level location in the second hierarchy, so that information exists in the intersection between the first location and second location.

20. An apparatus that facilitates accessing information, comprising:

a processor;

a user interface, wherein the user interface comprises a branching structure for a first hierarchy and a second hierarchy in a user interface by expanding the branching structure for the first hierarchy and the branching structure for the second hierarchy;

a two-way bread crumb trail within the user interface that presents a path to a location through higher-level locations in a hierarchy, and also presents one or more lower-level locations, which branch from the location;

wherein the two-way bread crumb trail includes a navigation mechanism which is configured to:
  navigate to the higher-level location when the user selects the higher-level location on the path; and
  navigate to a lower-level location when the user selects the lower-level location which branches from the location; and wherein the apparatus is further comprises a mechanism configured to:
  receive, from a user, a specifier for a first location in the first hierarchy and a specifier for a second location in the second hierarchy;
  retrieve information, if such information exists, from an intersection between the first location in the first hierarchy and the second location in the second hierarchy;
  use browsing histories for users that have browsed the hierarchy to determine a set of the users that have each browsed to at least one of the first location and the second location, wherein the set of the users comprises at least one of the users that is different from the user; and
  determine a ranking for the information by using rankings from the set of the users, wherein determining the ranking comprises using a given ranking in the rankings, wherein the given ranking corresponds to a given user in the set of the users that has browsed to a browsed location, and wherein the given ranking is determined based on at least one of an indication whether or not the given user saved the browsed location and an indication whether or not the browsed location was an endpoint of a browsing session for the given user; and wherein the user interface is configured to present the retrieved information to the user in a rank order based on the ranking.

* * * * *